M. N. DIALL.
TANK TRAP.
APPLICATION FILED JAN. 20, 1914.
1,095,827.
Patented May 5, 1914.
Fig. 1.
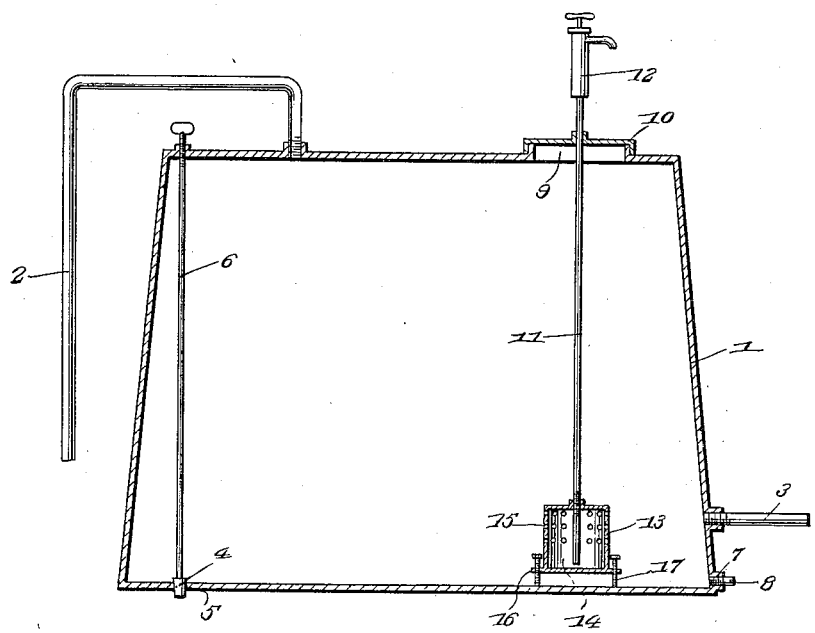
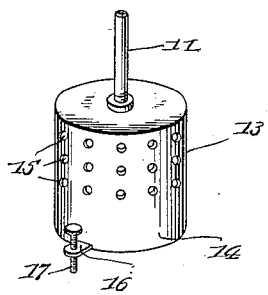
Fig. 2.
Inventor
M. N. Diall,
Witnesses
J. H. Crawford.
D. W. Gould
By Victor J. Evans
Attorney

UNITED STATES PATENT OFFICE.

MARTIN N. DIALL, OF SEDAN, KANSAS.

TANK-TRAP.

1,095,827.   Specification of Letters Patent.   Patented May 5, 1914.

Application filed January 20, 1914. Serial No. 813,351.

*To all whom it may concern:*

Be it known that I, MARTIN N. DIALL, a citizen of the United States, residing at Sedan, in the county of Chautauqua and State of Kansas, have invented new and useful Improvements in Tank-Traps, of which the following is a specification.

The invention relates to an improvement in tank traps designed particularly for use in connection with field tanks for the reception of oil from the wells, from which tanks the oil is delivered to the pipe line by means of the usual field pumps.

The main object of the present invention is the provision of a trap for use with such tanks wherein a full volume of oil may be drawn from the tank upon the occasion of cleaning the same, with the result of saving that quantity of oil heretofore lost when removing the worthless sediment from the tank.

The invention in the preferred form of details will be described in the following specification, reference being had particularly to the accompanying drawings, in which:—

Figure 1 is a vertical sectional view, partly in elevation, illustrating the tank and showing the application of the improved trap thereto. Fig. 2 is a perspective view of the trap removed.

Referring particularly to the accompanying drawings, the improved tank, which is of the usual construction, includes a receptacle of appropriate size, as 1, preferably wholly inclosed and into which oil from the wells is delivered through the medium of the pipe 2 entering the tank from the top. The oil from the tank is delivered to the field pumps through an outlet pipe 3 opening from the tank a predetermined distance above the bottom of the latter. A cleaning plug 4 coöperates with an opening 5 in the bottom of the tank, the plug being operable from the top of the tank through the usual screw standard 6. An opening 7 is formed in the side wall of the tank immediately above the bottom, which opening is adapted to be normally closed by a removable plug 8, the opening 7 serving as a water outlet. In the use of tanks of this character, there is precipitated a sediment of a wholly worthless character and which when it has accumulated to a certain depth in the tank, approximately two or three inches below the oil outlet 3, no further oil is delivered through the outlet and the tank must be cleaned. As the tanks have a considerable capacity and as it is practically impossible to draw therefrom through the outlet 3 all of the contained oil, after taking up some of the undesirable sediment, it follows that in cleaning the tank in the usual manner through the opening 5 a very considerable quantity of oil is lost.

The present invention is designed to obviate this loss and to provide simple means whereby the oil layer above the sediment can be readily drawn off from the tank and saved.

In carrying out the invention I form an opening 9 in the top of the tank designed to be closed by a removable cover 10 through which is passed a pipe 11, provided above the cover with any usual or preferred type of pump 12.

Secured to the lower end of the pipe 11 is a trap proper including a cylindrical body 13 closed at the bottom and having its wall solid or imperforate for a predetermined distance above the bottom as at 14, that portion of the wall above the imperforate portion being perforated as at 15. The bottom of the body is formed with outstanding ears 16 through which are threaded what may be termed adjusting rods 17. The trap body is preferably supported from the pipe 11 and the latter opens into the interior of the body so that any material finding its way through the perforations 15 may be pumped from said body through the pipe 11.

In cleaning a tank, the depth of the sediment in the bottom thereof is first determined, and the adjusting rods 17 operated in accordance with such information so as to position the lowermost line of perforations 15 just above the surface line of the sediment. The trap is then lowered into the tank until the lower ends of the adjusting rods rest upon the bottom of the tank, and the pump operated with the effect to draw off all of the oil above the surface line of the sediment. The plug 4 is then removed from the opening 5 and the sediment allowed to gravitate through said opening in the usual manner.

The improvement described provides a means which may be conveniently used with any number of tanks or oil receptacles and through the medium of which the oil heretofore lost through the cleaning of the tank may be saved, the particular construction of the trap providing for the convenient use thereof with tanks having a sediment collection of different depths.

What is claimed is:—

1. The combination with a tank, of a trap therefor, a pump connection from the trap leading through the top of the tank, said trap including a cylindrical body closed at the bottom and having upper and lower portions respectively perforated and imperforate, and means carried by the trap for adjusting the bottom thereof in spaced relation to the bottom of the tank, whereby to position the lowermost part of the perforated upper portion of the trap at a predetermined distance from the bottom of the tank.

2. The combination with a tank, of a trap therefor, a pump connection from the trap leading through the top of the tank, said trap including a cylindrical body closed at the bottom and having upper and lower portions respectively perforated and imperforate, ears projecting from the bottom of the trap, rods threaded through the ears to be projected a desired distance below the bottom of the trap.

In testimony whereof I affix my signature in presence of two witnesses.

MARTIN N. DIALL.

Witnesses:
A. L. SCOTT,
ALFRED L. BROWN.

Copies of this patent may be obtained for five cents each, by addressing the "Commissioner of Patents, Washington, D. C."